United States Patent
Earley et al.

(10) Patent No.: US 12,223,084 B1
(45) Date of Patent: Feb. 11, 2025

(54) DATA CENTER MONITORING AND MANAGEMENT OPERATION INCLUDING A PROTECTED DATA TAG OPERATION

(71) Applicant: Dell Products L.P., Round Rock, TX (US)

(72) Inventors: Damon G. Earley, Round Rock, TX (US); Srija Dasika, Austin, TX (US); Sumedh Wasudeo Sathaye, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 18/374,230

(22) Filed: Sep. 28, 2023

(51) Int. Cl.
*G06F 21/62* (2013.01)

(52) U.S. Cl.
CPC .................. *G06F 21/6227* (2013.01)

(58) Field of Classification Search
CPC .................................................. G06F 21/6227
See application file for complete search history.

(56) References Cited

U.S. PATENT DOCUMENTS

| | | | | |
|---|---|---|---|---|
| 7,178,033 B1 * | 2/2007 | Garcia | ................ | G06F 21/6209 713/184 |
| 10,296,750 B1 * | 5/2019 | Rossman | ................ | G06F 21/62 |
| 2007/0006294 A1 * | 1/2007 | Hunter | ................ | H04L 63/1441 726/1 |
| 2012/0023166 A1 * | 1/2012 | Kim | ....................... | H04W 4/043 709/204 |
| 2014/0304512 A1 * | 10/2014 | Kotov | ....................... | H04L 9/14 713/171 |
| 2015/0186635 A1 * | 7/2015 | Nakhjiri | ................... | H04L 69/22 726/17 |
| 2019/0087595 A1 * | 3/2019 | Czajkowski | ........ | H04L 63/0442 |
| 2022/0391543 A1 * | 12/2022 | Bos | ......................... | G06F 21/72 |

OTHER PUBLICATIONS

List of Patents or Patent Applications Treated as Related, Dec. 2024.

* cited by examiner

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium for performing a data center monitoring and management operation. The data center monitoring and management operation includes: generating a data tag for an object within a data center asset, the generating the data tag for the object associating a contextual meaning with the object; mapping the data tag to the object, the mapping the data tag to the object associating a data tag with the object; and, protecting the data tag to provide a protected data tag, the protecting the data tag ensuring that only an authorized user can manage an aspect of the protected data tag.

20 Claims, 6 Drawing Sheets

DATA CENTER MONITORING AND MANAGEMENT OPERATION INCLUDING A PROTECTED DATA TAG OPERATION

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: generating a data tag for an object within a data center asset, the generating the data tag for the object associating a contextual meaning with the object; mapping the data tag to the object, the mapping the data tag to the object associating a data tag with the object; and, protecting the data tag to provide a protected data tag, the protecting the data tag ensuring that only an authorized user can manage an aspect of the protected data tag.

In another embodiment the invention relates to a system comprising: a processor; a data bus coupled to the processor; and, a non-transitory, computer-readable storage medium embodying computer program code, the non-transitory, computer-readable storage medium being coupled to the data bus, the computer program code interacting with a plurality of computer operations and comprising instructions executable by the processor and configured for: generating a data tag for an object within a data center asset, the generating the data tag for the object associating a contextual meaning with the object; mapping the data tag to the object, the mapping the data tag to the object associating a data tag with the object; and, protecting the data tag to provide a protected data tag, the protecting the data tag ensuring that only an authorized user can manage an aspect of the protected data tag.

In another embodiment the invention relates to a computer-readable storage medium embodying computer program code, the computer program code comprising computer executable instructions configured for: generating a data tag for an object within a data center asset, the generating the data tag for the object associating a contextual meaning with the object; mapping the data tag to the object, the mapping the data tag to the object associating a data tag with the object; and, protecting the data tag to provide a protected data tag, the protecting the data tag ensuring that only an authorized user can manage an aspect of the protected data tag.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium for performing a data center monitoring and management operation, described in greater detail herein. Various aspects of the invention reflect an appreciation that it is common for a typical data center to monitor and manage tens, if not hundreds, of thousands of different assets, such as certain computing and networking devices, as described in greater detail herein. Certain aspects of the invention likewise reflect an appreciation that such data center assets, which may be distributed, are typically implemented to work in combination with one another for a particular purpose. Likewise, various aspects of the invention reflect an appreciation that such purposes generally involve the performance of a wide variety of tasks, operations, and processes to service certain workloads.

Various aspects of the invention reflect an appreciation that certain tasks, operations, and processes performed to service a particular workload may include the use of one or more identity and access management (IAM) systems within a federated identity environment, as described in greater detail herein. Likewise, various aspects of the invention reflect an appreciation that such IAM systems may each have its own access control framework. Furthermore, various aspects of the invention reflect an appreciation that such access control frameworks typically structure and implement role and access-based controls differently, as well as how privileges and permissions are defined. As a result, manual intercession is typically needed to update and change the mapping of defined roles and privileges for each system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
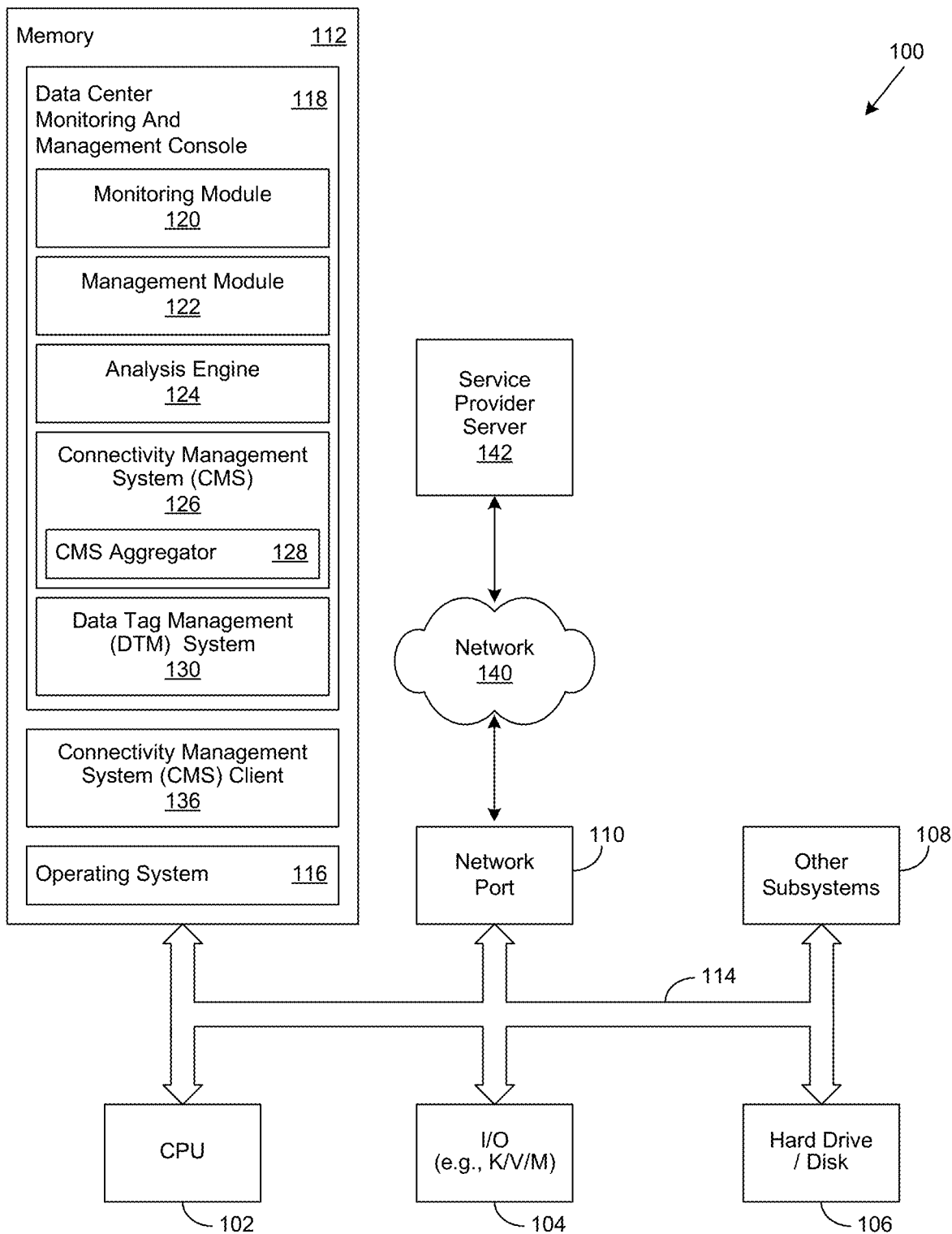
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118, or a connectivity management system (CMS) client 136. In one embodiment, the information handling system 100 is able to download the data center monitoring and management console 118, or the CMS client 136, or both, from the service provider server 142. In another embodiment, the functionality respectively provided by the data center monitoring and management console 118, or the CMS client 136, or both, may be provided as a service from the service provider server 142.

In certain embodiments, the data center monitoring and management console 118 may include a monitoring module 120, a management module 122, an analysis engine 124, a connectivity management system (CMS) 126, and a data tag management (DTM) system 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 136, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 136 to perform a connectivity management operation, described in greater detail herein. As an example, the CMS 126 may be implemented on one information handling system 100, while the CMS client 136 may be implemented on another, as likewise described in greater detail herein.

Figure 2:
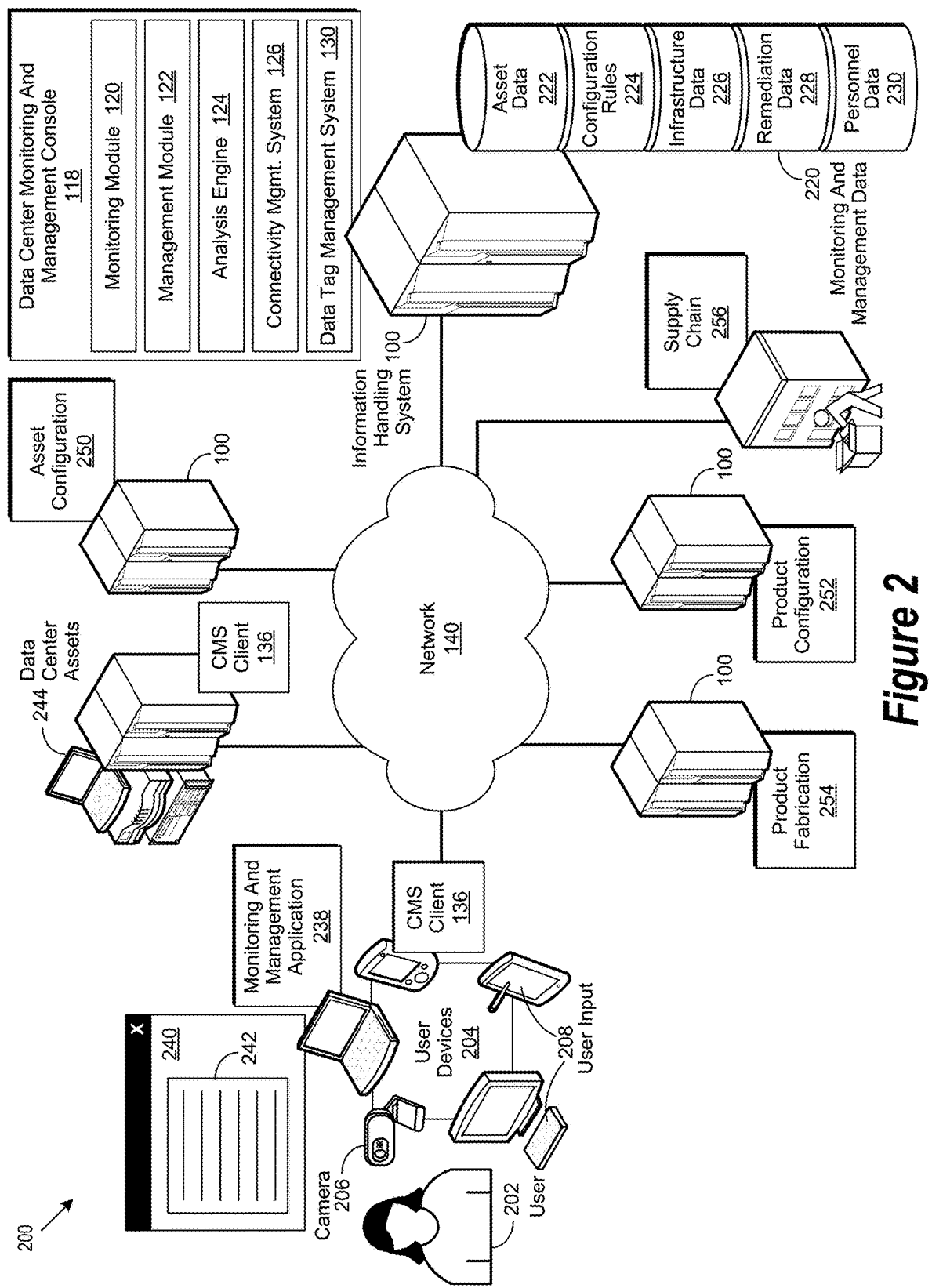
FIG. 2 shows a block diagram of a data center monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to a data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioners of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, operation, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operation may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, a data tag management (DTM) system 130, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the monitoring module 120, the management module 122, the analysis engine 124, CMS 126, and the DTM system 130, may be implemented, individually or in combination with one another, to perform a data center asset monitoring and management operation, as likewise described in greater detail herein. In various embodiments, a CMS client 136 may be implemented on certain user devices 204, or certain data center assets 244, or a combination thereof. In various embodiments, the CMS 126 may be implemented in combination with a particular CMS client 136 to perform a connectivity management operation, as described in greater detail herein. In various embodiments, the CMS 126 may likewise be implemented in combination with the DTM system 130 to perform a data center monitoring and management operation, described in greater detail herein. In certain embodiments, a data center monitoring and management operation may be implemented to include one or more data tag management (DTM) operations, likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, a data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater detail herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task they are assigned, described in greater detail herein.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well as the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at a later time to perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented to receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure, a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
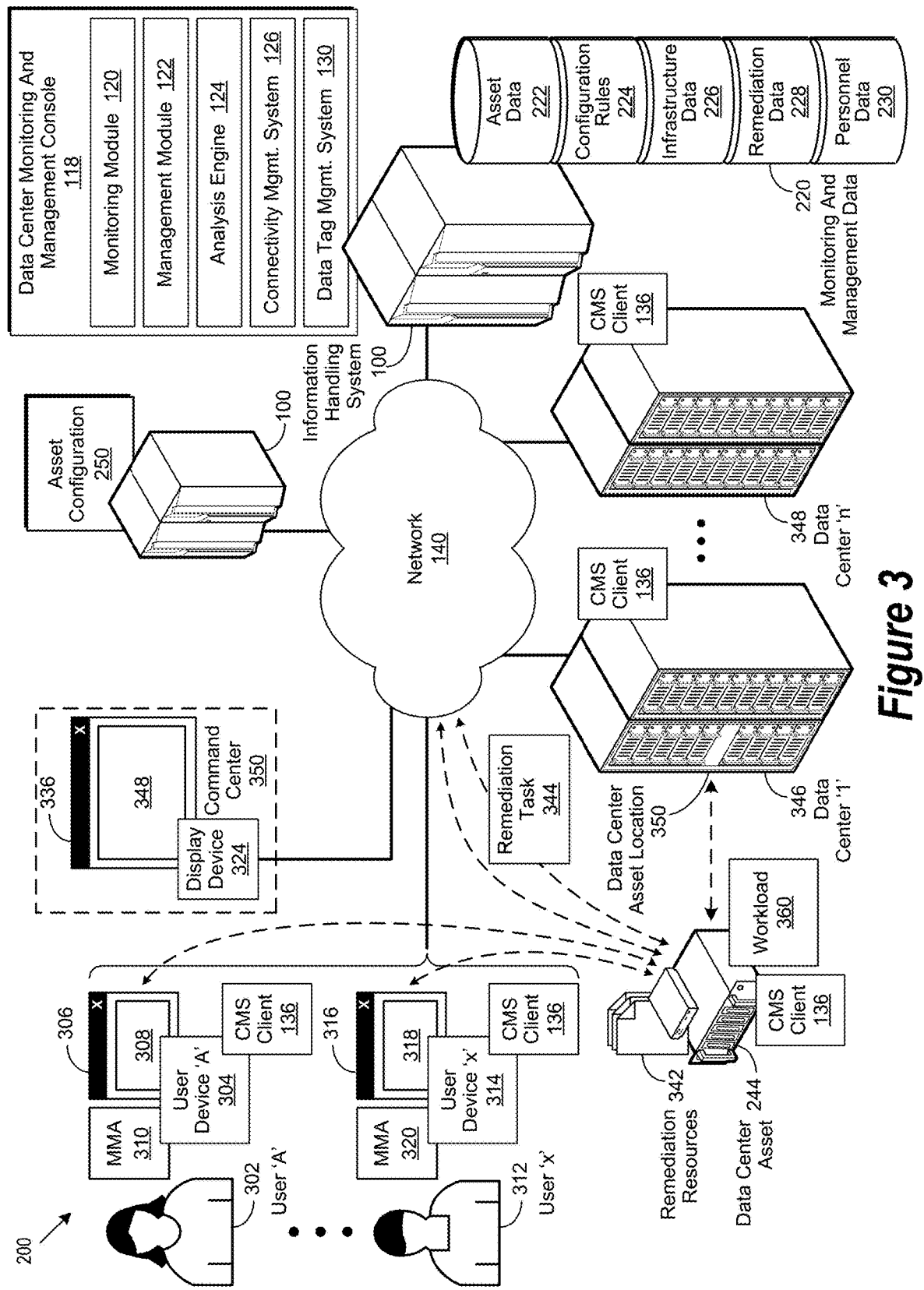
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, and a data tag management (DTM) system 130, or a combination thereof, as described in greater detail herein. In various embodiments, a CMS client 136, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 136 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments, the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation. In various embodiments, performance of the data center monitoring and management operation may include the performance of one or more data tag management (DTM) operations, or one or more workload management operations, or a combination thereof, as described in greater detail herein.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented to generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
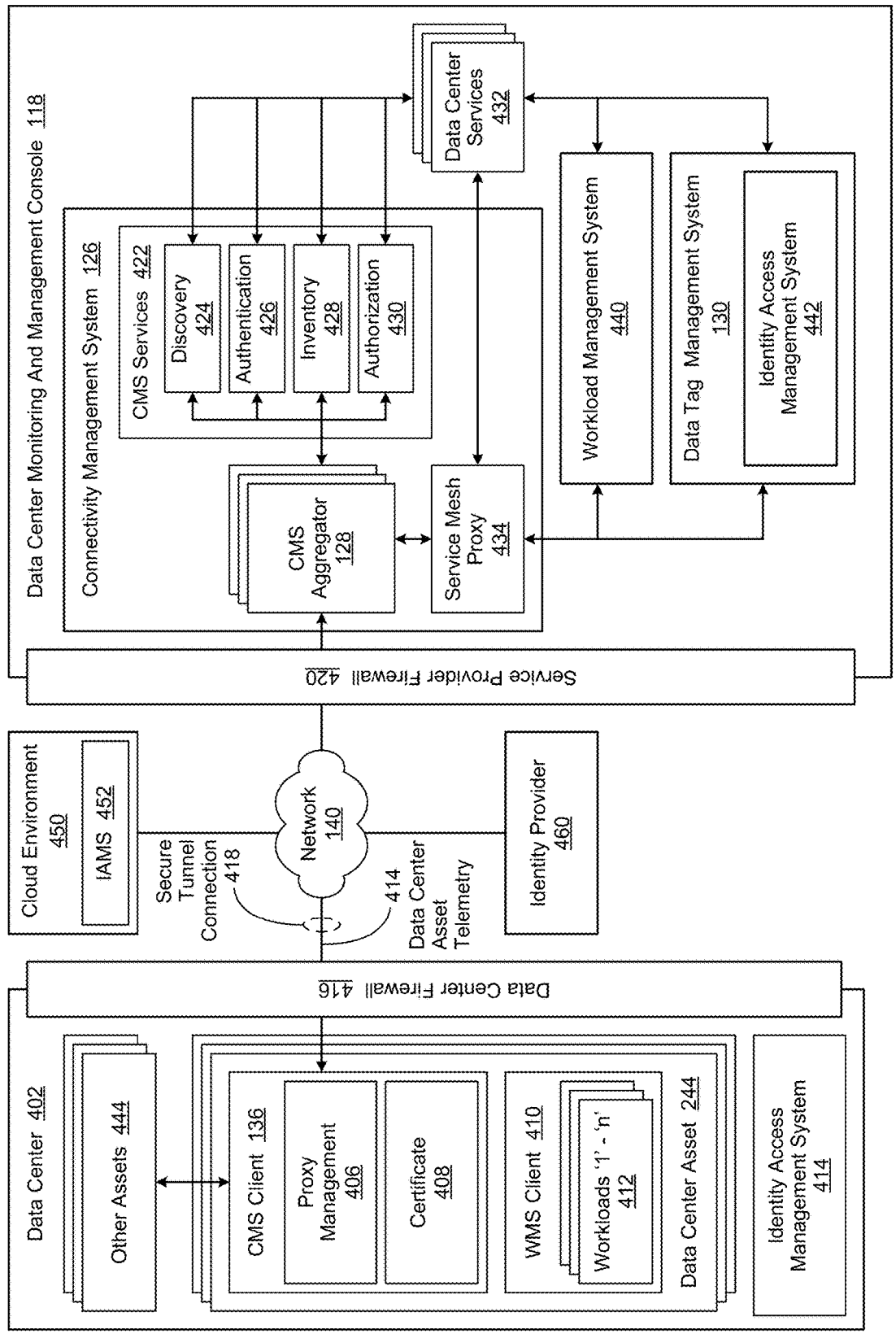
FIG. 4 shows a block diagram of a data center monitoring and management console.

FIG. 4 shows a block diagram of a data center monitoring and management console implemented in accordance with an embodiment of the invention. In various embodiments, the data center monitoring and management console 118, described in greater detail herein, may be implemented to include a connectivity management system (CMS) 126, a data tag management (DTM) system 130, a workload management system (WMS) 440, and one or more data center services 432, or a combination thereof. In various embodiments, the CMS 126 may be implemented individually, or in combination with a particular CMS client 136 to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, as described in greater detail herein.

In various embodiments, the DTM system 130 may be implemented to perform one or more data tag management (DTM) operations. As used herein, a data tag, which may also be referred to as a data label, broadly refers to a non-hierarchical keyword or term that can be associated with a particular object in a system to assist in describing it, or one or more of its aspects, such that the object can be found, or processed automatically, or a combination of the two. Accordingly, as likewise used herein, a DTM operation broadly refers to any task, function, operation, procedure, or process performed to manage one or more aspects of a data tag, or its association with a particular object in a system, or a combination thereof. In various embodiments, the association of one or more data tags with a particular object may be broadly referred to as "tagging" or "labeling."

Skilled practitioners will be familiar with the concept of an object, which in the field of computer science can be a variable, a data structure, a function, or a method. In various embodiments, such an object may be a data object. Those of skill in the art will likewise be familiar with a data object, which generally refers to a region of storage that contains a value or group of values. Each of these values can be accessed using its identifier or a more complex expression that refers to the object.

In various embodiments, each data object may be implemented to have a unique data type. In various embodiments, the data type of an object may be used to determine the storage allocation for that object and the interpretation of its associated values during subsequent access. Accordingly, in various embodiments, a data object may be one or more data elements, one or more data files, one or more volumes of data, or a combination thereof.

In various embodiments, a particular object in a system may be tagged with one or more data tags to give it an associated contextual meaning. In various embodiments, the particular object is tagged in response to an indication of a desire to provide a contextual meaning for the object. As used herein, contextual meaning broadly refers to a definition in which a meaning of the object is partly or wholly determined by defining the meaning of a larger expression containing the definiendum (i.e., the object to be defined). In various embodiments, such data tags may be implemented as a key=value string, or a value string with no specific key, or an implicit key, or a combination thereof. In various embodiments, one or more data tags may be implemented to facilitate the management of certain data. As an example, "move all data volumes tagged mode-backup from data center asset 'A' to data center asset 'B.'"

Various embodiments of the invention reflect an appreciation that users may make errors, such as spelling mistakes, when associating a particular data tag with a particular object. Likewise, various embodiments of the invention reflect an appreciation that users may sometimes define and use new keys for existing data tag concepts. For example, the data tags "place=<value>," "location=<value>," and "address=<value>" may share the same contextual meaning.

Various embodiments of the invention likewise reflect an appreciation that users may not be aware of correlation between keys used in certain data tags. As an example, when associating a mode-production data tag with an object, it may be beneficial to also associate a location=Austin data tag to the same object if, and only if, the object is both located in Austin and used in a production mode. As another example, a policy may be implemented to force the addition of a non-correlated data tag to an object when certain data tags are associated with it. To illustrate the example, the data tag org=HQ may be automatically added to an object whenever the data tag location=Austin is associated with it.

Likewise, various embodiments of the invention reflect an appreciation that users may not be aware of a data tag's value, especially when using a particular data tag in an operation. For example, a user may use the data tag machine-motor to initiate a search. In this embodiment, the user may not be aware, from either historical or statistical knowledge, that they may also need to use the data tag machine-engine to maximize the results of their search.

Accordingly, one or more DTM operations may be performed in various embodiments to remove user errors, or spelling mistakes, or a combination of the two, from certain data tags. In various embodiments, one or more DTM operations may likewise be performed to suggest, or otherwise provide, alternative key words to describe one or more units of information, or one or more of related aspects, or a combination thereof. One or more DTM operations may likewise be performed in various embodiments to provide correlation-based guidance to users by suggesting data tags that may be related.

Likewise, one or more DTM operations may be performed in various embodiments to propose certain data tag coalescing functions to a user by suggesting alternative data tags within a user interface (UI) to prevent data tag duplication. In various embodiments, one or more DTM operations may be performed to anticipate certain user interactions, such as correlations of data tag keys that may require user approval when they do not adhere to a particular data tag policy. One or more DTM operations may likewise be performed in certain embodiments to provide suggestions to a user within a UI on how they may improve their data tags.

In various embodiments, as described in greater detail herein, one or more data center assets may be implemented to use one or more objects in a system when processing a particular workload 412 '1' through 'n'. In certain of these embodiments, the processing of the workload 412 '1' through 'n' may be facilitated, as likewise described in greater detail herein, by performing one or more DTM operations to associate certain data tags with certain objects.

In various embodiments, one or more such DTM operations may be performed within a cloud computing environment (CCE) 450. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, services, and so forth) that can be rapidly provisioned and released with minimal management effort or service provider interaction.

As likewise used herein, provisioning broadly refers to the process of making available, and configuring, one or more components of an information technology (IT) infrastructure for use, directly or indirectly, within a CCE 450. As such, various embodiments of the invention reflect an appreciation that such provisioning may include the performance of one or more DTM operations to facilitate user and system access to various data center assets and associated resources. Various embodiments of the invention likewise reflect an appreciation that such provisioning may include the performance of multiple tasks and involve multiple systems, data center assets, and associated resources, or a combination thereof.

Those of skill in the art will be aware that cloud computing, as typically implemented, has certain characteristics, such as on-demand self-service. As a result, a user can unilaterally and automatically provision certain computing capabilities, such as server time and network storage, without requiring human interaction with each CCE 450. Another characteristic of cloud computing is broad network access, where certain cloud computing capabilities may be made available over a network connection and accessed through standard mechanisms that promote use by heterogeneous thin or thick client platforms (e.g., mobile phones, tablets, laptops, and workstations).

Yet another characteristic of cloud computing is resource pooling, where cloud computing resources are pooled to serve multiple users in a multi-tenant model, with different physical and virtual resources dynamically assigned and reassigned according to individual demand. One aspect of resource pooling is a sense of location independence in that the user generally has no control over, or knowledge of, the exact location of the provided resources. Yet still another characteristic of cloud computing is elasticity, where cloud computing capabilities and functionalities can be elastically provisioned and released, in some cases automatically, to rapidly scale outward and inward according to demand. As a result, the resources available for provisioning often appear to be unlimited, and furthermore, can be appropriated in any quantity, at any time.

Another characteristic of cloud computing is the ability to automatically control and optimize resource utilization by leveraging a metering capability at some level of abstraction appropriate to the type of service (e.g., storage, processing, bandwidth, and active user accounts). Accordingly, resource usage can be monitored, controlled, and reported, providing transparency for both the provider and the user of a particular service. In various embodiments, one or more DTM operations may be performed to automate such resource utilization, and by extension, make it more efficient.

Various embodiments of the invention reflect an appreciation that cloud computing may be implemented to support various service models. One such cloud service model is Software as a Service (Saas), which allows a user to use certain software applications running in a CCE 450. As typically implemented, the applications are accessible from various client devices through either a thin client interface, such as a web browser (e.g., web-based email), or an Application Program Interface (API). As such, the user does not manage or control the underlying cloud computing infrastructure including network, servers, operating systems, storage, or even individual application capabilities.

Another cloud service model is Platform as a Service (PaaS), which allows a user to deploy custom-created, or acquired, software applications that have been created through the use of programming languages, libraries, services, and tools supported by the cloud computing infrastructure. In a PaaS model, the user does not manage or control the underlying cloud computing infrastructure, including network, servers, operating systems, or storage, but may have control over the deployed applications and associated configuration settings. Yet another cloud service model is Infrastructure as a Service (IaaS), which provides a user the ability to provision processing, storage, network connectivity, and other fundamental computing resources to implement and run one or more workloads 412 '1' through 'n.' As in other cloud service models, the user does not manage or control the underlying cloud computing infrastructure, but has control over operating systems, storage, and deployed applications; and possibly limited control of certain networking components (e.g., host firewalls).

In various embodiments, a CCE 450 may be implemented as a private, public, or hybrid CCE 450. As used herein, a private CCE 450 broadly refers to a cloud computing infrastructure provisioned for exclusive use by a single organization comprising multiple consumers (e.g., business units, departments, individual users, etc.). As such, it may be owned, managed, and operated by the organization, a third party, or some combination of the two, and it may exist on or off premises.

As likewise used herein, a community CCE 450 broadly refers to a cloud computing infrastructure provisioned for exclusive use by a specific community, or set, of users from organizations that have shared interests or objectives (e.g., their common mission, security requirements, policy, compliance considerations, etc.). Accordingly, it may be owned, managed, and operated by one or more of the organizations that are a member of the community, a third party, or some combination thereof, and it may exist on or off premises. Likewise, as used herein, a public CCE 450 broadly refers to a cloud computing infrastructure that is provisioned for open use by the general public. It may be owned, managed, and operated by a business, academic, government organization, or non-government organization, or some combination thereof, but it exists on the premises of the cloud computing provider, whoever they may be. Examples of such public CCEs 450 include Amazon Web Services (AWS®), Oracle® Cloud Platform, Microsoft® Azure®, and others.

A hybrid CCE 450, as used herein, broadly refers to a CCE 450 that is a composition of two or more distinct CCEs 450 (e.g., private, community, or public) that remain unique and separate entities, but are bound together by standardized or proprietary technology that enables data and application portability (e.g., cloud bursting for load balancing between clouds). In certain embodiments, a hybrid CCE 450 may be implemented by an organization that maintains one or more private CCEs 450 of its own, while likewise using one or more private, community, or public CCEs 450 provided by others. In various embodiments, certain multi cloud approaches may involve the use of two or more private, community, public, or hybrid CCEs 450, or a combination thereof. In various embodiments, one or more CCEs 450 may be implemented to include a data center monitoring and management environment.

In various embodiments, the DTM system 130 may be implemented to include an identity and access management system (IAM) system 442. Skilled practitioners of the art will be familiar with the concept of identity and access management, which in the field of information technology (IT) broadly refers to a framework of policies, processes, and technologies for managing an entity's digital identity and controlling their access to a particular resource according to their identity and one or more associated roles, or one or more permissions, or a combination thereof. In various embodiments, the IAM system 442 may be implemented to perform an IAM operation.

As used herein, an IAM operation broadly refers to any task, function, operation, procedure, or process performed to manage an entity's digital identity and controlling their access to a particular resource according to their identity and one or more associated roles, or one or more permissions, or a combination thereof. As likewise used herein, an entity broadly refers to something that exists as itself, whether physically or abstractly. Accordingly, in various embodiments, an entity may be a human user, or a data center asset, or a combination of the two. In these embodiments, the one or more roles, or the one or more permissions, or a combination of the two, associated with a particular entity, the method by which they may respectively be defined, the method by which they may respectively be associated with the identity of a particular entity, and the method by which they may respectively be used in a particular IAM operation, is a matter of design choice.

In various embodiments, the digital identity of a particular entity may be instantiated by an identity provider (IdP) 460. Those of skill in the art will be familiar with the concept of an IdP, which typically refers to a system that creates, stores, and manages digital identities. In various embodiments, the IdP may be implemented to authenticate a particular entity, or provide authentication services to a resource, or a combination of the two.

In various embodiments, the IdP 460 may be implemented as a cloud-enabled service. In certain of these embodiments, the IdP 460 may be implemented in a CCE 450. In various embodiments, the IdP (not shown) may be implemented within the data center monitoring and management console 118. In certain of the these embodiments, the IdP may be implemented as a data center service 432. In various embodiments, the IdP (not shown) may be implemented in an on-premises data center 402. In various embodiments, two or more IdPs may be implemented to be used in combination with one another during the performance of an IAM operation.

In various embodiments, the IdP 460 may be implemented to support known federated identity approaches. Skilled practitioners of the art will be familiar with various federated identity approaches, which typically allows authorized entities to access certain domains, applications, workloads 412, and data center assets 244 through the use of a single set of credentials. In typical implementations, federated identity links an entity's identity across two of more IAM systems 442, 414, 452 such that they can access different domains, applications, workloads 412, and data center assets 244 securely and efficiently.

In various embodiments, an IAM system 414 may be implemented on a particular data center asset 244. In various embodiments, an IAM system 452 may be implemented within a particular CCE 450. In various embodiments, the IAM systems 442, 414, and 452 may be implemented individually, or in combination with one another, to perform a particular IAM operation. In various embodiments, the IAM systems 442, 414, and 452 may be implemented individually, or in combination with one another, to likewise work in combination with one or more IdPs 460 to perform a particular IAM operation.

In certain embodiments, the CMS 126, and the DTM system 130, may likewise be implemented in combination with one another to perform a particular connectivity management operation, or a particular DTM operation, or a combination of the two. In various embodiments, the data center monitoring and management console 118 may be implemented in a cloud environment familiar to skilled practitioners of the art. In various embodiments, the cloud environment may be distributed. In certain embodiments, such a distributed cloud environment may be implemented to include two or more on-premises data centers 402.

In certain embodiments, each data center 402 may be implemented to include one or more data center monitoring and management environments, described in greater detail herein. In various embodiments, each data center monitoring and management environment may be implemented to include one or more data center monitoring and management consoles 118. In certain of these embodiments, the two are more data center monitoring and management consoles 118 may be implemented to operate in combination with one another to perform one or more data center monitoring and management operations, or one or more DTM operations, or one or more workload management operations, or a combination thereof. In certain embodiments, a particular data center monitoring and management console 118 implemented in one data center monitoring and management environment may likewise be implemented to perform one or more data center monitoring and management operations, or one or more DTM operations, or one or more workload management operations, or a combination thereof, within another data center monitoring and management environment.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In certain embodiments, a data center 402 may be implemented to include an associated data center firewall 416. In certain embodiments, the operator of the data center monitoring and management console 118 may offer its various functionalities and capabilities in the form of one or more cloud-based data center services 432, described in greater detail herein. In certain of these embodiments, the data center 402 may reside on the premises of a user of one or more data center services 432 provided by the operator of the data center monitoring and management console 118.

In various embodiments, one or more data center assets 244, described in greater detail herein, may be implemented within a particular on-premises data center 402. In certain embodiments, individual data center assets 244 may be implemented to include a workload management system (WMS) client 410, or a CMS client 136, or both. As used herein, a workload management system (WMS) 410, broadly refers to any software, firmware, or hardware, of a combination thereof, that may be implemented to perform one or more WMS operations. As likewise used herein, a WMS operation broadly refers to any function, operation, procedure, or process performed, directly or indirectly, to forecast, plan, distribute, schedule, configure, initiate, manage, or monitor, or a combination thereof, one or more workloads 412 '1' through 'n' such that they may be serviced by one or more data center assets 244.

One example of a WMS 410 is a hypervisor. Skilled practitioners of the art will be familiar with a hypervisor, also known as a virtual machine monitor (VMM), or virtualizer, which broadly refers to a type of computer software, firmware, or hardware, or a combination thereof, that can be implemented to create and run a virtual machine (VM). Those of skill in the art will likewise be familiar with a VM, which is a virtualization, or emulation, of a computer system that can be implemented to provide the functionality of a physical computer, or a particular capability thereof. In certain embodiments, a VM may be implemented in certain embodiments to service one or more workloads 412 '1' through 'n'.

Another example of a WMS 410 is a container orchestration system, such as the open source container orchestration system known as Kubernetes®. Skilled practitioners of the art will be familiar with container orchestration systems, which broadly refer to a type of computer software, firmware, or hardware, or a combination thereof, that can be implemented to automate the operational effort involved in running containerized workloads and services on one or more data center assets 244. Those of skill in the art will likewise be familiar with a container, which is a unit of software that packages computer code, and its dependencies, such that an associated software application is able to run quickly and reliably across one or more computing environments. In certain embodiments, a container orchestration system may be implemented in certain embodiments to orchestrate one or more containers as one or more workloads 412 '1' through 'n'. Skilled practitioners of the art will recognize that many such examples of a WMS 410 and an associated workload 412 '1' through 'n' are possible. Accordingly, the foregoing is not intended to limit the spirit, scope, or intent of the invention.

In various embodiments, a CMS client 136 implemented on one data center asset 244 may likewise be implemented to enable one or more connectivity management operations, or one or more DTM operations, or a combination thereof, associated with one or more other data center assets 444 that are not respectively implemented with their own CMS client 136. In certain of these embodiments, the CMS client 136 may be implemented to assume the identity, and attributes, of a particular data center asset it is directly, or indirectly, associated with. In various embodiments, the CMS client 136 may be implemented to convey certain DTM operation information associated with a particular data center asset 244 that may be used to service a particular workload 412 '1' through 'n,' directly or indirectly, during a particular interval of time to the CMS aggregator 128.

In certain of these embodiments, the DTM operation information may be conveyed as data center asset telemetry information 414 via a secure tunnel connection 418, described in greater detail herein, through a network 140 to a particular CMS aggregator 128. In certain embodiments, a CMS aggregator 128 may be implemented to provide such data center asset telemetry information 414 to the DTM system 130, or the WMS 440, either directly, or through a service mesh proxy 434, likewise described in greater detail herein. In various embodiments, a CMS aggregator 128 may be implemented to provide certain data center asset telemetry information 414 to the STM system 130, or the WMS 440, as one or more CMS services 422. In certain of these embodiments, one or more data center services 432 may be implemented to receive such data center asset telemetry information 414 from one or more CMS services 422 and then provide it to the DTM system 130, or the WMS 440.

In various embodiments, the CMS client 136 may be implemented with a proxy management module 406. In certain of these embodiments, the proxy management module 406 may be implemented to manage the CMS client's 136 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a data center firewall 416 may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 136 to pass, while the service provider firewall 420 may be configured to allow traffic emanating from the CMS aggregator 128 to pass. Likewise, the service provider firewall 420 may be configured in various embodiments to allow incoming traffic emanating from the CMS client 136 to be received, while the data center firewall 416 may be configured to allow incoming network traffic emanating from the CMS aggregator 128 to be received.

In various embodiments, a particular CMS aggregator 128 may be implemented in combination with a particular CMS client 136 to provide a split proxy that allows an associated data center asset 244 to securely communicate with a data center monitoring and management console 118. In various embodiments, the split proxy may be implemented in a client/server configuration. In certain of these embodiments, the CMS client 136 may be implemented as the client component of the client/server configuration and the CMS aggregator 128 may be implemented as the server component. In certain of these embodiments, one or more connectivity management operations may be respectively performed by the CMS aggregator 128 and the CMS client 136 to establish a secure tunnel connection 418 through a particular network 140, such as the Internet.

In various embodiments, the secure tunnel connection 418 may be initiated by the CMS client 136 first determining the address of the CMS aggregator 128 it intends to connect to. In these embodiments, the method by which the address of the CMS aggregator 128 is determined is a matter of design choice. Once the address of the CMS aggregator 128 is determined, the CMS client 136 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 136, which triggers the CMS client 136 to provide its requested TLS certificate 408. In certain embodiments, the CMS authentication 426 service may be implemented to generate and provision the TLS certificate 408 for the CMS client 136. In certain embodiments, the CMS client 136 may be implemented to generate a self-signed TLS certificate if it has not yet been provisioned with one from the CMS authentication 426 service.

In various embodiments, the CMS client 136 may then provide an HTTP header with a previously-provisioned authorization token. In certain embodiments, the authorization token may have been generated and provisioned by the CMS authentication 426 service once the CMS client has been claimed. As used herein, a claimed CMS client 136 broadly refers to a particular CMS client 136 that has been bound to an account associated with a user, such as a customer, of one or more data center services 432 provided by the data center monitoring and management console 118.

In certain embodiments, a CMS client 136 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 136, or both, is a matter of design choice.

In various embodiments, the CMS client 136 may be implemented to have a stable, persistent, and unique identifier (ID) after it is claimed. In certain of these embodiments, the CMS client's 136 unique ID may be stored within the authorization token. In these embodiments, the method by the CMS client's 136 unique ID is determined, and the method by which it is stored within an associated authorization token, is a matter of design choice.

Once the CMS client 136 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) to request the CMS client 136 to validate its certificate 408. In certain embodiments, the validation of the CMS client's 136 certificate 408 is performed by the CMS authorization 430 service.

In various embodiments, the validation of the CMS client's 136 certificate 408 is performed to determine a trust level for the CMS client 136. In certain of these embodiments, if the CMS client's 136 certificate 408 is validated, then it is assigned a "trusted" classification. Likewise, if CMS client's 136 certificate 408 fails to be validated, then it is assigned an "untrusted" classification.

Accordingly, certain embodiments of the invention reflect an appreciation that "trusted" and "claimed," as used herein as they relate to a CMS client 136 are orthogonal. More specifically, "trust" means that the channel of communication can be guaranteed. Likewise, "claimed" means the CMS client 136 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 136, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 136 and the CMS aggregator 128 may be implemented to send logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 136. In certain embodiments, the CMS discovery 424 service may be implemented to track the relationships between individual CMS clients 136 and the CMS aggregators 128 they may be connected to.

In various embodiments, the CMS discovery 424 service may be implemented to detect CMS client 136 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 136. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 136 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 136 possesses the private keys corresponding to an associated certificate 408. In various embodiments, the CMS authorization 430 service may be implemented to authenticate a particular CMS client 136 associated with a corresponding data center asset 244. In certain of these embodiments, the CMS authorization 430 service may be implemented to perform the authentication by examining a certificate 408 associated with the CMS client 136 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 136, and one or more CMS aggregators 128, or a combination thereof.

Figure 5:
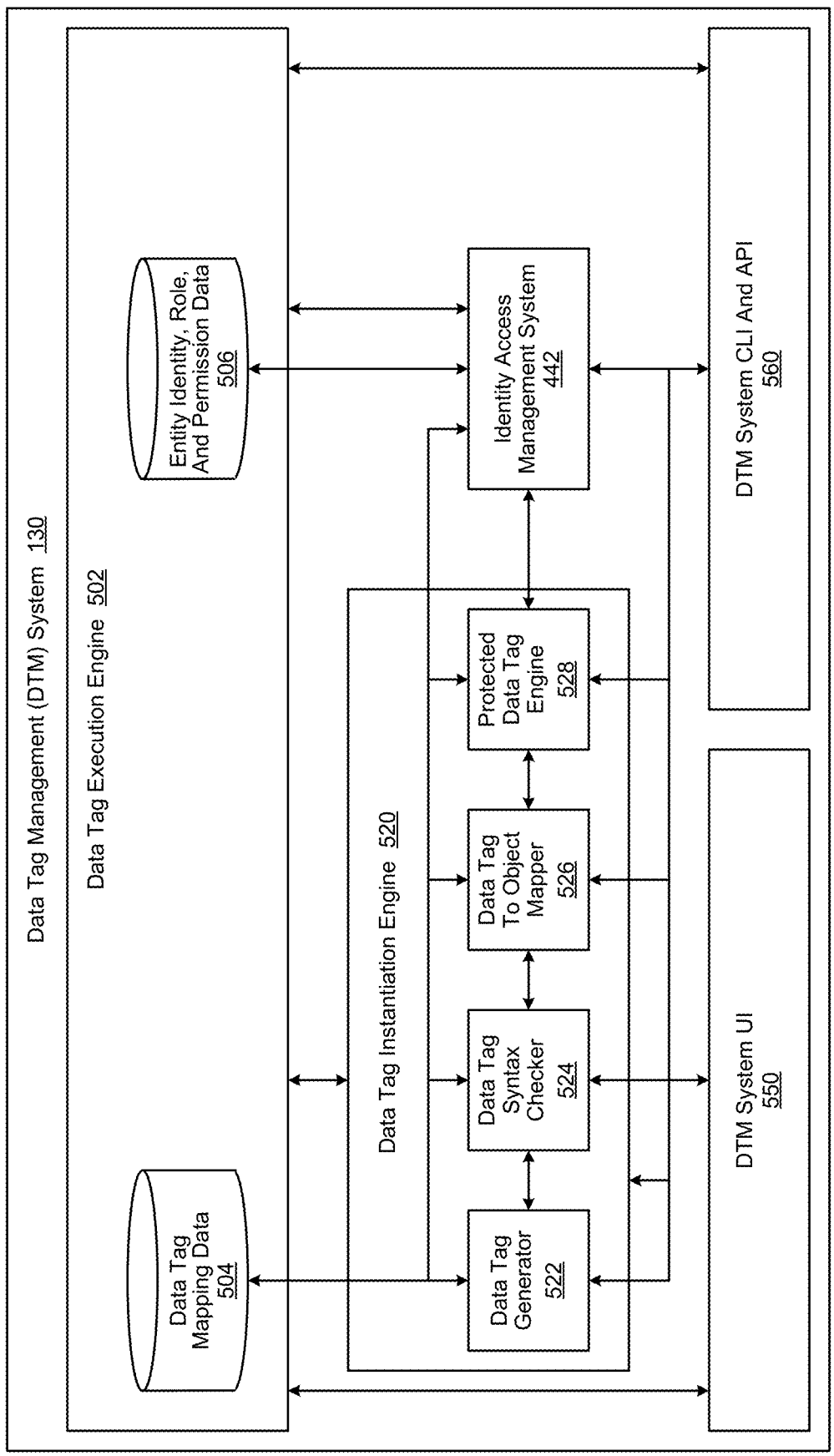
FIG. 5 is a simplified block diagram of a data tag management (DTM) system.

FIG. 5 is a simplified block diagram of a data tag management (DTM) system implemented in accordance with an embodiment of the invention. In various embodiments, the DTM system 130 may be implemented to perform one or more DTM operations, described in greater detail herein. In certain of these embodiments, a DTM operation may be implemented to include one or more data tag instantiation operations, or one or more identity and access management (IAM) operations, or a combination of the two, as likewise described in greater detail herein.

In various embodiments, the DTM system 130 may be implemented to include a data tag execution engine 502, a data tag instantiation engine 520, an IAM system 442, a DTM system user interface (UI) 550, and a DTM system Command Line Interface (CLI) and Application Program Interface (API) 560, or a combination thereof. In various embodiments, the data tag execution engine 502 may be implemented to include a repository of data tag mapping data 504, or a repository of entity identity, role, and permission data 506, or both. In various embodiments, the repository of data tag mapping data 504 may be implemented to index, store, retrieve, and provide data tags and associated information related to their respective mapping to one or more objects in a system. In various embodiments, the repository of entity identity, role, and permission data 506 may be implemented to index, store, retrieve, and provide certain digital identity, role, and permission data associated with a particular entity.

In various embodiments, the data tag execution engine 502 may be implemented to perform one or more DTM operations on behalf of the DTM system 130. In certain of these embodiments, the data tag execution engine 502 may be implemented to execute one or more tasks, functions, operations, procedures, or processes, or a combination thereof, associated with the performance of a particular DTM operation. In various embodiments, the data tag execution engine 502 may be implemented to use certain data tag mapping data 504, or certain entity identity, role, and permission data 506, or a combination of the two, to perform a particular DTM operation on behalf of the DTM system 130.

In various embodiments, the data tag instantiation engine 520 may be implemented to perform one or more data tag instantiation operations. As used herein, a data tag instantiation operation broadly refers to any task, function, operation, procedure, or process performed to generate a data tag, or a protected data tag, check its syntax, and map it to a particular object in a system, or a combination thereof. In various embodiments, the data tag instantiation engine 520 may be implemented to include a data tag generator 522 module, data tag syntax checker 524 module, a data tag-to-object mapper 526 module, and a protected data tag engine 528 module, or a combination thereof. In various embodiments, a data tag instantiation operation may be implemented to include one or more data tag generation operations, one or more data tag syntax checking operations, one or more data tag-to-object mapping operations, or one or more protected data tag operations, or a combination thereof.

In various embodiments, the data tag generator 522 module may be implemented to perform a data tag generation operation. As used herein, a data tag generation operation broadly refers to any task, function, operation, procedure, or process, or a combination thereof, performed to generate a data tag, described in greater detail herein. In various embodiments, a data tag may be implemented as a key=value string, or a value string with no specific key, or an implicit key, or a combination thereof. In various embodiments, the format selected for a particular data tag, the method by which it may be selected, and the method by which the data tag may be generated, is a matter of design choice.

In various embodiments, the data tag syntax checker 524 module may be implemented to perform a data tag syntax checking operation. As used herein, a data tag syntax checking operation broadly refers to any task, function, operation, procedure, or process, or a combination thereof, performed to ensure that a particular data tag, or protected data tag, adheres to one or more syntactic policies. For example, a syntactic policy may include a requirement that the structure of all data tags implemented within a particular system adhere to a particular key=value format. To continue the example, the syntactic policy may define whether or not the use of commas, or spaces, is allowed within a data tag. In various embodiments, the definition of such syntactic polices, the method by which they may be implemented, and the method by which they may be enforced, is a matter of design choice.

In various embodiments, the data tag-to-object mapper 526 module may be implemented to perform a data tag-to-object mapping operation. As used herein, a data tag-to-object mapping operation broadly refers to any task, function, operation, procedure, or process, or a combination thereof, performed to associate a particular data tag, or protected data tag, with a particular object in a system. For example, one or more data tag-to-object mapping operations may be performed to map the data tag data=archive to any object in a system that meets the criteria of being a data object that should be archived. As another example, one or more data tag-to-object mapping operations may be performed to map the data tag data=production to any object in a system that meets the criteria of being a data object used in a production data processing environment. In various embodiments, the method by which it is determined that a particular data tag should be mapped to a particular object, and the method by which it may be mapped, is a matter of design choice.

In various embodiments, the protected data tag engine 528 module may be implemented to perform a protected data tag operation. As used herein, a protected data tag broadly refers to a data tag that has been protected such that only an authorized entity is allowed to create, delete, revise, or extend one or more of its aspects, or its association with a particular object in a system, or a combination thereof. Accordingly, as likewise used herein, a protected data tag operation broadly refers to any task, function, operation, procedure, or process, or a combination thereof, performed by an authorized entity to create, delete, revise, or extend one or more aspects of a protected data tag, or its association with a particular object in a system, or a combination thereof. As an example, a system administrator may be an authorized entity, while a user of the system may not. In these embodiments, the determination of whether or not a particular entity is authorized to perform a protected data tag operation, and the method by which such a determination may be made, is a matter of design choice.

In various embodiments, a protected data tag operation may be performed to persist a protected data tag's association with a particular object in a system until such time that association is discontinued, or revised, by an authorized entity. As an example, an authorized entity, such as a system administrator, may perform a protected data tag operation to create a protected data tag AssetClass=ProductionServer, which may then be associated with one or more servers designated for use in a production environment. In this example, a user, who is not an authorized entity, may desire to repurpose a particular server in the production environment for archiving databases.

However, they would not be able to revise the server's protected data tag to reflect such a change in the server's use. Instead, they would need to have the system administrator perform a protected data tag operation to fulfill the request, To continue the example, the system administrator may then perform a protected data tag operation to revise the server's protected data tag of AssetClass=ProductionServer to AssetClass=ArchiveServer.

In various embodiments, the data tag generator 522 module may be implemented to perform one or more data tag generation operations by interacting, and exchanging data, with the data tag syntax checker 524 module, the data tag-to-object mapper 526 module, or the protected data tag engine 528 module, or a combination thereof. Likewise, the data tag syntax checker 524 module may be implemented in various embodiments to perform one or more data tag syntax checking operations by interacting, and exchanging data, with the data tag generator 522 module, the data tag-to-object mapper 526 module, or the protected data tag engine 528 module, or a combination thereof. In various embodiments, the data tag-to-object mapper 526 module may likewise be implemented to perform one or more data tag-to-object mapping operations by interacting, and exchanging data, with the data tag generator 522 module, the data tag syntax checker 524 module, or the protected data tag engine 528 module, or a combination thereof. Likewise, the protected data engine 528 module may likewise be implemented in various embodiments to perform one or more protected data tag operations by interacting, and exchanging data, with the data tag generator 522 module, the data tag syntax checker 524 module, or the data tag-to-object mapper 526 module, or a combination thereof. In various embodiments, the data tag generator 522 module, the data tag syntax checker 524 module, the data tag-to-object mapper 526 module, and the protected data tag engine 528 module may be implemented to access, retrieve, and use certain data tag mapping data 506 to respectively perform one or more data tag generation operations, one or more data tag syntax checking operations, one or more data tag-to-object mapping operations, and one or more protected data tag operations.

In various embodiments, the IAM system 442 may be implemented to perform one or more IAM operations. As used herein, an IAM operation broadly refers to any task, function, operation, procedure, or process performed to manage an entity's digital identity, or control their access to a particular resource according to that identity, or both, as described in greater detail herein. In various embodiments, the performance of a particular IAM operation may involve the performance of one or more associated DTM data tag operations, described in greater detail herein.

In various embodiments, the IAM system 442 may be implemented as an entity that is authorized to perform a particular protected data tag operation by interacting, and exchanging data, with the protected data tag instantiation engine 520 and its associated modules. In certain of these embodiments, the IAM system 442 may be implemented to perform one or more protected data tag operations on behalf of another authorized entity, such as a system administrator. As an example, a system administrator that is authorized to perform a protected data tag operation may program the IAM system 442 to perform a series of protected data tag operations at some point of time in the future if a certain event occurs.

In various embodiments, the IAM system 442 may be implemented to use certain protected data tags in the performance of an IAM operation to manage an entity's digital identity, or control their access to a particular resource according to that identity, or both. In various embodiments, an IAM operation may include the performance of one or more protected data tag extension operations. As used herein a protected data tag extension operation broadly refers to any task, function, operation, procedure, or process performed to extend the functionality of a protected data tag by mapping its primary value to one or more secondary values, as described in greater detail herein. In various embodiments, one or more protected data tag extension operations may be performed to generate a protected data tag whose value may be implemented to abstract one or more associated entity roles, one or more entity permissions, or a combination thereof.

In various embodiments, one or more protected data tag extension operations may be performed to generate a protected data tag extension by mapping the value of a protected data tag to the key of one or more non-protected data tags, as described in greater detail herein. In certain of these embodiments, the values of the one or more non-protected data tags may be one or more entity roles, one or more entity permissions, or a combination thereof. In various embodiments, the IAM system 442 may be implemented to be used in combination with the protected data tag engine 528 module, the data tag-to-object mapping 526 module, to perform the protected data tag extension operation. Skilled practitioners of the art will recognize that there many such ways to perform a protected data tag extension operation are possible. Accordingly, the foregoing is not intended to limit the spirit, scope, or intent of the invention.

In various embodiments, one or more IAM operations may be performed to manage the association of one or more roles with a particular digital entity. In certain of these embodiments, one or more IAM operations may be performed to extend a primary role or permission associated with an entity's digital identity to one or more associated secondary roles or permissions, as described in greater detail herein. In various embodiments, one or more IAM operations may be performed to extend the definition of a primary or secondary role to include certain permissions, as likewise described in greater detail herein.

As an example, the IAM system 442 may be implemented to support federated identity, described in greater detail herein, for authentication and authorization. In this example, a set of protected data tags may be used for enforcement of permissions associated with a user's actions, such as Role1=StorageAdmin. To continue the example, an authorized entity, such as a system administrator, may perform an IAM operation to create a protected data tag extension that defines the role of a storage administrator as StorageAdmin={myStorageAdmin, myBackupAdmin}, where myStorageAdmin and myBackupAdmin are defined in the context of the system. As a result, the creation of the protected data tag extension allows the system to collapse the level of indirection by replacing the value of StorageAdmin to create the protected data tag Role1={myStorageAdmin, myBackupAdmin}. Accordingly, whenever a user is authenticated they may then be permitted to interact with the system if their role is presented as myStorageAdmin or myBackupAdmin.

In various embodiments, the DTM system UI 550 may be implemented to allow user access to certain functionalities provided by the data tag execution engine 502, or the IAM system 442, or both. In various embodiments, the DTM system CLI and API 560 may likewise be implemented to respectively allow user and system access to certain functionalities provided by the data tag execution engine 502, or the IAM system 442, or both. In various embodiments, the DTM system UI 550 and the DTM system CLI and API 560 may be respectively implemented to access, and interact with, the data tag generator 522, the data tag syntax checker 524, the data tag-to-object mapper 526, and the protected data tag engine 528 modules.

Figure 6:
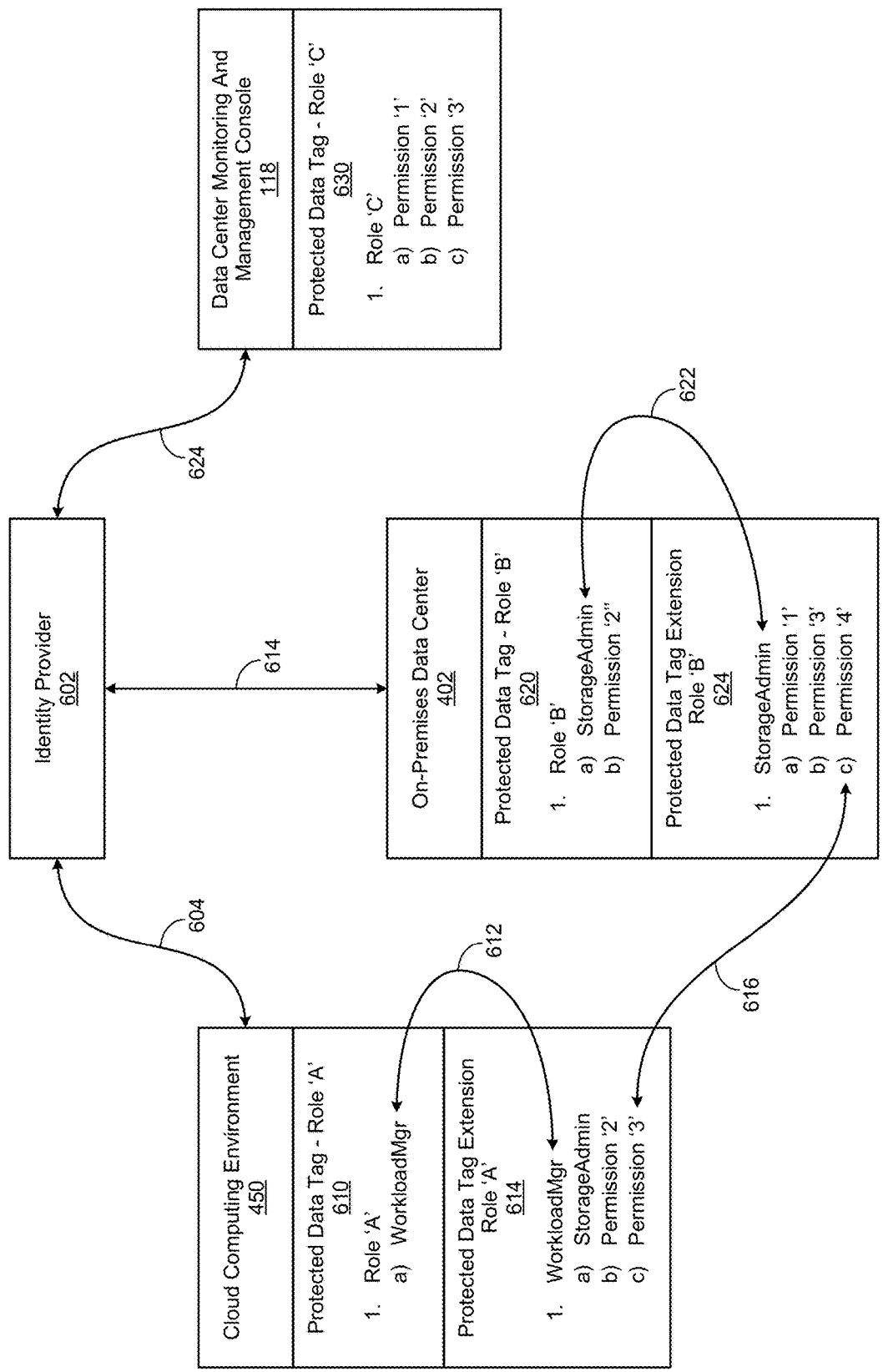
FIG. 6 is a simplified block diagram show example protected data tag extensions implemented within a federated identity environment.

FIG. 6 is a simplified block diagram showing example protected data tag extensions implemented in accordance with an embodiment of the invention within a federated identity environment. In various embodiments, as described in greater detail herein, one or more protected data tags may be implemented within a federated identity environment to manage an entities access to certain resources. For example, as shown in FIG. 6, an identity provided (IdP) 602 may be implemented within a federated identity environment, as likewise described in greater detail herein, to respectively provide 604, 614. 624 identity management services to a cloud computing environment (CCE) 450, an on-premises data center 402, and a data center monitoring an management console 118.

In this example, protected data tags 610, 620, 630 may respectively be generated for an entity whose has role 'A' within the CCE 450, role 'B' within the on-premises data center 402, and role 'C' in the data center monitoring and management console 118. To continue the example, the entity's role 'A' is defined as "WorkloadMgr," role 'B' is defined as both "StorageAdmin" and "Permission '2,'" and role 'C' is defined as permissions '1,' '2,' and '3.' To continue the example further, one or more protected data tag extension operations 612 may be performed to generate a protected data tag extension 614 for role 'A', such that the role 'A' definition of "WorkloadMgr" is extended to be defined by the values "StorageAdmin" and permissions '2' and '3.'

Likewise, one or more protected data tag extension operations 622 may be performed to generate a protected data tag extension 624 for role 'B,' such that the role 'B' definition of "StorageAdmin" is extended to be defined by the values permissions '1,' '3' and '4.' To continue the example yet further, one or more protected data tag extension operations 616 may be performed to further extend the protected data tag extension 614 such that the role 'A' definition of "WorkloadMgr" is extended to include permission '4' from the protected data tag extension 624 for role 'B.' Those of skill in the art will recognize that many such examples of protected data tag, and protected data tag extension, operations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    establishing a secure communication channel between a data center asset and data tag management system, the data tag management system executing within a data center monitoring and management console;
    generating, via the data tag management system, a data tag for an object within a data center asset, the generating the data tag for the object associating a contextual meaning with the object, the contextual meaning of the object comprising a definition in which a meaning of the object is determined by defining a larger expression containing a definiendum of the object;
    mapping, via the data tag management system, the data tag to the object, the mapping the data tag to the object associating a data tag with the object; and,
    protecting, via the data tag management system, the data tag to provide a protected data tag, the protecting the data tag ensuring that only an authorized user can manage an aspect of the protected data tag, managing the aspect of the protected data tag including one or more of creating, deleting, revising and extending association of the protected data tag with the object, the protecting the data tag ensuring that only the authorized user can create, delete, revise or extend the association of the protected data tag with the object.

2. The method of claim 1, wherein:
    the protecting includes persisting an association of the protected data tag with a particular object of the data center asset.

3. The method of claim 1, further comprising:
performing an identity and access management operation, the identify and access management operation managing an aspect of an identity of the authorized user.

4. The method of claim 3, wherein:
the aspect of the identity of the authorized user determines whether an entity is authorized to manage the aspect of the protected data tag.

5. The method of claim 1, further comprising:
generating a protected data tag extension, the protected data tag extension extending a function of the protected data tag.

6. The method of claim 5, wherein:
the function of the protected data tag is extended by mapping a value of the protected data tag to a key of a non-protected data tag.

7. A system comprising:
a processor;
a data bus coupled to the processor; and,
a non-transitory, computer-readable storage medium embodying computer program code, the non-transitory, computer-readable storage medium being coupled to the data bus, the computer program code interacting with a plurality of computer operations and comprising instructions executable by the processor and configured for:
establishing a secure communication channel between a data center asset and data tag management system, the data tag management system executing within a data center monitoring and management console;
generating, via the data tag management system, a data tag for an object within a data center asset, the generating the data tag for the object associating a contextual meaning with the object, the contextual meaning of the object comprising a definition in which a meaning of the object is determined by defining a larger expression containing a definiendum of the object;
mapping, via the data tag management system, the data tag to the object, the mapping the data tag to the object associating a data tag with the object; and,
protecting, via the data tag management system, the data tag to provide a protected data tag, the protecting the data tag ensuring that only an authorized user can manage an aspect of the protected data tag, managing the aspect of the protected data tag including one or more of creating, deleting, revising and extending association of the protected data tag with the object, the protecting the data tag ensuring that only the authorized user can create, delete, revise or extend the association of the protected data tag with the object.

8. The system of claim 7, wherein:
the protecting includes persisting an association of the protected data tag with a particular object of the data center asset.

9. The system of claim 7, wherein the instructions executable by the processor are further configured for:
performing an identity and access management operation, the identify and access management operation managing an aspect of an identity of the authorized user.

10. The system of claim 9, wherein:
the aspect of the identity of the authorized user determines whether an entity is authorized to manage the aspect of the protected data tag.

11. The system of claim 7, wherein the instructions executable by the processor are further configured for:
generating a protected data tag extension, the protected data tag extension extending a function of the protected data tag.

12. The system of claim 11, wherein:
the function of the protected data tag is extended by mapping a value of the protected data tag to a key of a non-protected data tag.

13. A non-transitory, computer-readable storage medium embodying computer program code, the computer program code comprising computer executable instructions configured for:
establishing a secure communication channel between a data center asset and data tag management system, the data tag management system executing within a data center monitoring and management console;
generating, via the data tag management system, a data tag for an object within a data center asset, the generating the data tag for the object associating a contextual meaning with the object, the contextual meaning of the object comprising a definition in which a meaning of the object is determined by defining a larger expression containing a definiendum of the object;
mapping, via the data tag management system, the data tag to the object, the mapping the data tag to the object associating a data tag with the object; and,
protecting, via the data tag management system, the data tag to provide a protected data tag, the protecting the data tag ensuring that only an authorized user can manage an aspect of the protected data tag, managing the aspect of the protected data tag including one or more of creating, deleting, revising and extending association of the protected data tag with the object, the protecting the data tag ensuring that only the authorized user can create, delete, revise or extend the association of the protected data tag with the object.

14. The non-transitory, computer-readable storage medium of claim 13, wherein:
the protecting includes persisting an association of the protected data tag with a particular object of the data center asset.

15. The non-transitory, computer-readable storage medium of claim 13, wherein the computer executable instructions are further configured for:
performing an identity and access management operation, the identify and access management operation managing an aspect of an identity of the authorized user.

16. The non-transitory, computer-readable storage medium of claim 15, wherein:
the aspect of the identity of the authorized user determines whether an entity is authorized to manage the aspect of the protected data tag.

17. The non-transitory, computer-readable storage medium of claim 13, wherein the computer executable instructions are further configured for:
generating a protected data tag extension, the protected data tag extension extending a function of the protected data tag.

18. The non-transitory, computer-readable storage medium of claim 17, wherein:
the function of the protected data tag is extended by mapping a value of the protected data tag to a key of a non-protected data tag.

19. The non-transitory, computer-readable storage medium of claim 13, wherein:
the computer executable instructions are deployable to a client system from a server system at a remote location.

20. The non-transitory, computer-readable storage medium of claim 13, wherein:
  the computer executable instructions are provided by a service provider to a user on an on-demand basis.

\* \* \* \* \*